United States Patent
Mitchell, II

[11] Patent Number: 5,915,402
[45] Date of Patent: Jun. 29, 1999

[54] REFRIGERATION ISOLATION VALVE APPARATUS AND METHOD OF USE

[76] Inventor: William G. Mitchell, II, 1212 Hwy. 758, Eunice, La. 70535

[21] Appl. No.: 09/157,451

[22] Filed: Sep. 21, 1998

[51] Int. Cl.[6] .................................................. F25B 45/00
[52] U.S. Cl. .......................... 137/15; 137/14; 137/240; 137/613; 251/148; 62/292
[58] Field of Search .................. 137/14, 613, 614.01, 137/614.06, 626, 602, 586, 561, 15, 240; 251/152, 148, 315.01, 175; 62/77, 292

[56] References Cited

U.S. PATENT DOCUMENTS

| | | | |
|---|---|---|---|
| 2,732,169 | 1/1956 | Matteo | 251/148 |
| 3,545,490 | 12/1970 | Burrus | 137/614.06 |
| 3,997,140 | 12/1976 | Mullins | 251/145 |
| 4,438,779 | 3/1984 | Allread | 137/614.06 |
| 4,590,960 | 5/1986 | Koble, Jr. | 137/315 |
| 4,768,347 | 9/1988 | Manz et al. | 62/149 |
| 4,938,031 | 7/1990 | Manz et al. | 62/292 |
| 5,322,092 | 6/1994 | Howeth et al. | 62/149 |
| 5,332,001 | 7/1994 | Brown . | |
| 5,360,036 | 11/1994 | Kieper | 137/625.22 |
| 5,402,825 | 4/1995 | McCracken . | |
| 5,488,972 | 2/1996 | McCracken et al. | 137/614.06 |
| 5,540,254 | 7/1996 | McGowan et al. | 62/149 |
| 5,595,368 | 1/1997 | Bogdany et al. | 251/148 |
| 5,806,563 | 9/1998 | Rabby | 137/613 |

*Primary Examiner*—A. Michael Chambers
*Assistant Examiner*—Paul Coryea
*Attorney, Agent, or Firm*—Robert N. Montgomery

[57] ABSTRACT

A refrigeration isolation valve including an integral pair of ball valves closed coupled by a custom union for disconnecting and replacing charged refrigeration components. The annular bore through the valve bodies and coupling are consistent with the ball valve aperture. The external diameter of the valve body and coupling are also consistent. The isolation valve is further fitted with a vent for purging trapped air and refrigerant. A method is taught for isolating and disconnecting essential refrigerant components from a system and replacing such components with a precharged component without disturbing the system integrity.

5 Claims, 4 Drawing Sheets

REFRIGERATION ISOLATION VALVE APPARATUS AND METHOD OF USE

BACKGROUND OF THE INVENTION

1. Field of the Invention

This invention relates generally to refrigeration isolation valves and more particularly to an integral pair of ball valves close coupled by a union and the use of such combination as an isolation valve for disconnecting and replacing charged refrigeration components.

2. General Background

Commercial refrigeration systems and air conditioning systems have become absolute necessities in commercial ventures around the world. Such systems have become so much of everyday living that we depend on them for our existence and commerce to the point that we can hardly do without them even for short periods of time. These systems seem to break down more often in the hottest times of the year, thereby causing a backlog for the repair industry. Inventories are depleted and systems are down for long periods of time thus prompting repeated service calls. The problem is compounded further in countries where refrigeration service technicians are scarce. In many cases, although it is very simple to diagnose the problem in such systems, it is quite another to obtain essential critical components, especially such expensive components as condensing coils and compressors, and locate experienced technicians to install them immediately when they are needed. In most cases to make such major repairs as replacing a coil or compressor, the technicians must first recover the freon (required in some countries) from the system for disposal under regulated conditions. The technician must then cut the refrigeration lines leading to the component unit, thereby contaminating the system with moist air. When the new component is connected in place by soldiering the lines in an attempt to perfect a perfect seal, which is not always easily accomplished on the first try, the technician must draw a vacuum on the system prior to injecting new freon, all of which takes time and some degree of expertise.

The problem may be as simple as providing precharged components. Therefore, if the system is equipped with isolation valves which allow the refrigeration lines to be disconnected with very little loss of the vital freon gas from either the system or the component element, an experienced technician would not be required to get the system back on line. Further, precharged components could be warehoused more easily and ready for use when they are needed.

Isolation valves such as closed coupled ball valves have been developed as disclosed by Brown and McCracken in U.S. Pat. Nos. 5,332,001 and 5,402,825. These apparatus, although possibly effective in some applications are considerable more complicated and costly than is considered necessary for the application disclosed herein. It is also desirable to have a bleeder port located between the ball assemblies to allow for the purging of air trapped between the two balls when the system is reactivated. These two cited references do not provide such a mechanism nor do they have a method of capping the end of each valve while they are separated, thus preventing the accidental opening of a charged system or component. There is also no indication in these references that they are considered as being gas tight since they rely on a system of springs and seals for swivel alignment of one or both of the ball valves.

SUMMARY OF THE INVENTION

The instant invention and its method of use as disclosed herein addresses the problem described above and is based on the need for a quick interchange of refrigeration components by other than a skilled, trained refrigeration technician. A valve is provided having a pair of close coupled ball valves connected by a union operable by a spanner wrench. The two valves may be separated and independently capped, thus preventing possibility of accidental leakage. The valves are positioned in each of the inlet and discharge lines leading to and from various refrigeration components such as a condensing coil or a compressor unit. Therefore, if the charged component becomes defective and must be replaced, the connection can be broken by, first, simply closing each of the two valves and releasing the gas vent to release pressure on the valve fitting and turning the union with a spanner wrench until the connection is broken. A new precharged component having a compatible fitting can then be recoupled to the system. By cracking one of the valves, then closing the valve, the space between the valves is charged; then, by cracking the vent, a small amount of trapped air and gas is expelled. Resealing the vent and opening both valves to the maximum places the system back in functional operation.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
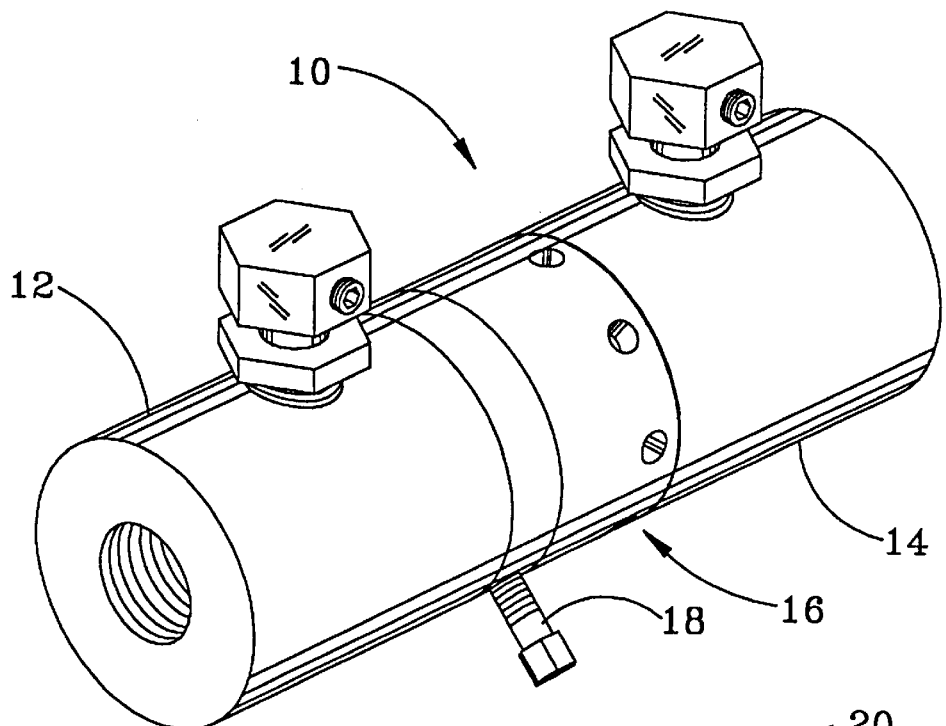
FIG. 1 is an isometric view of the preferred embodiment.
Figure 2:
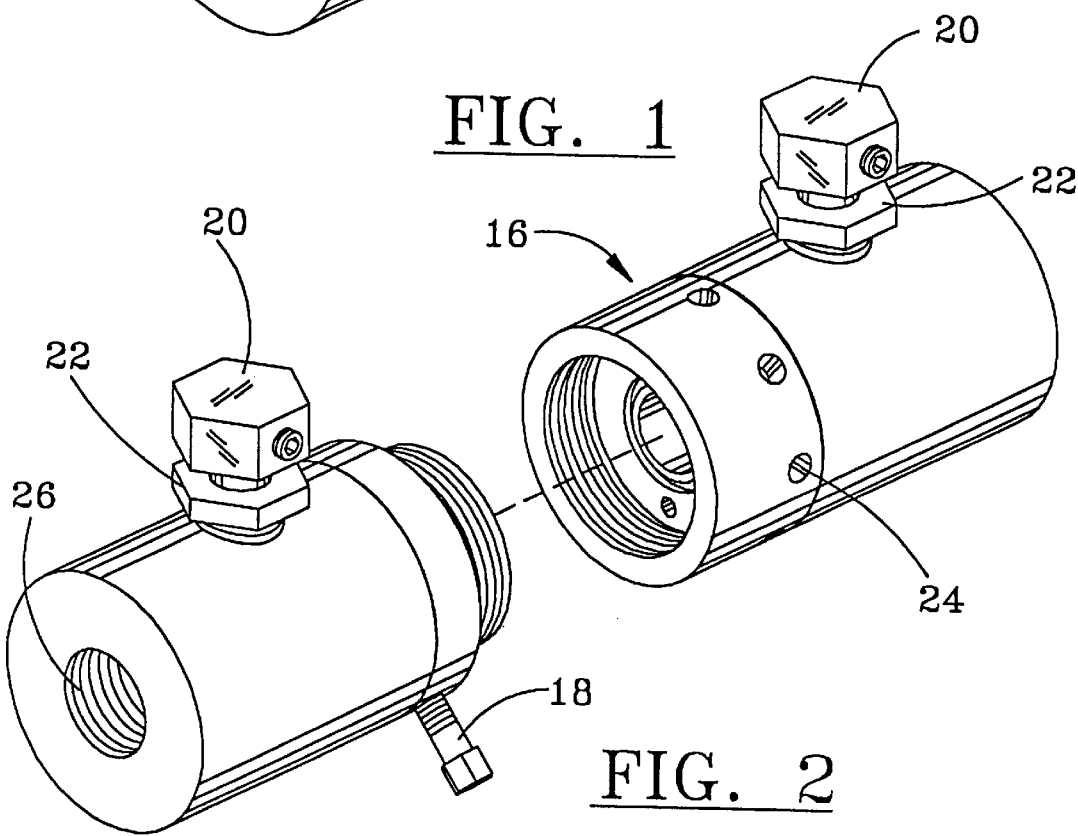
FIG. 2 is an isometric view of the preferred embodiment shown separated.
Figure 3:
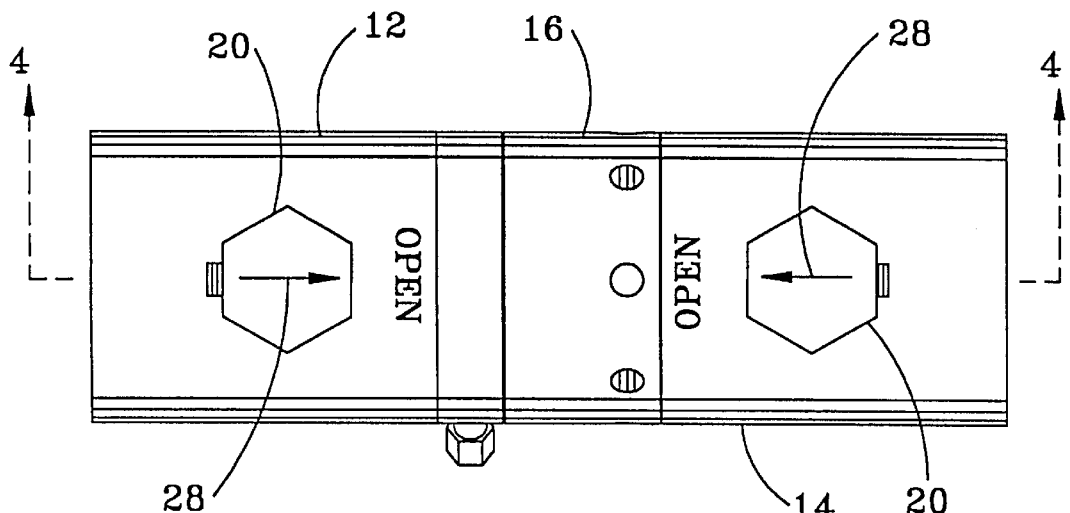
FIG. 3 is a top view of the preferred embodiment illustrated in FIG. 1.

As first seen in FIG. 1, the instant invention 10 includes two valve bodies 12,14 closed coupled by a union assembly 16 and having a vent screw 18 for purging the space between the two valve bodies. As seen in FIG. 2, the valve bodies 12,14 are separable by simply rotating the threaded union assembly 16. Internal ball valves located within each of the valve bodies 12,14 are operated by the hex head stem cap 20. A gland nut 22 provides compressive sealing for the stem. The union 16 which joins the two valve bodies is rotated by a spanner wrench fitted into the sockets 24 provided. Each of the valve bodies is internally threaded at one end 26 to be threadably connected to a refrigeration line fitting. Orientation of the two valve bodies whereby both valve stems 20 are in alignment as seem in FIG. 3 is achieved by the use of the union assembly or coupling 16. Indecia markings 28 on the valve stem head 20 and other such marking, on the valve body may be utilized to provide visual indication of valve position.

Figure 4:
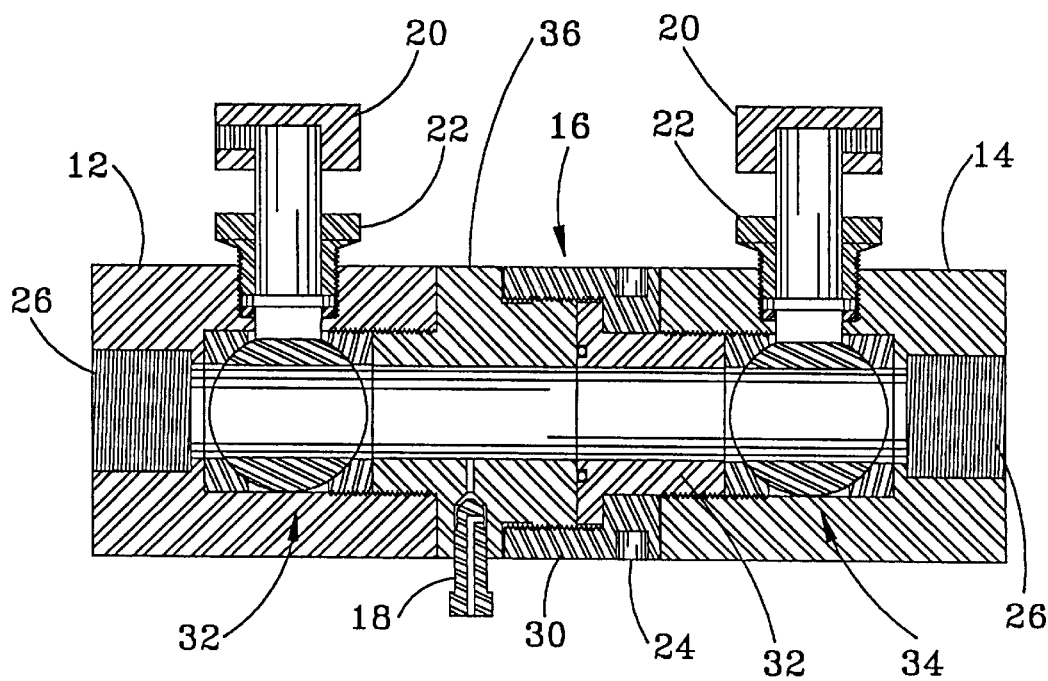
FIG. 4 is a cross-section view taken along sight lines 4—4 of the embodiment illustrated in FIG. 3.

As seen in cross-section in FIG. 4, we see the union assembly 16 includes a rotating collar 30 and a retaining member 32 which serves to retain the ball valve assembly 34 in position within the valve body 14 and further retain the rotatable collar 30. We also see a threaded adapter 36 is provided to retain the valve assembly 32 within its valve body 12 and further provide threaded adaptation to the union collar 30.

Figure 5:
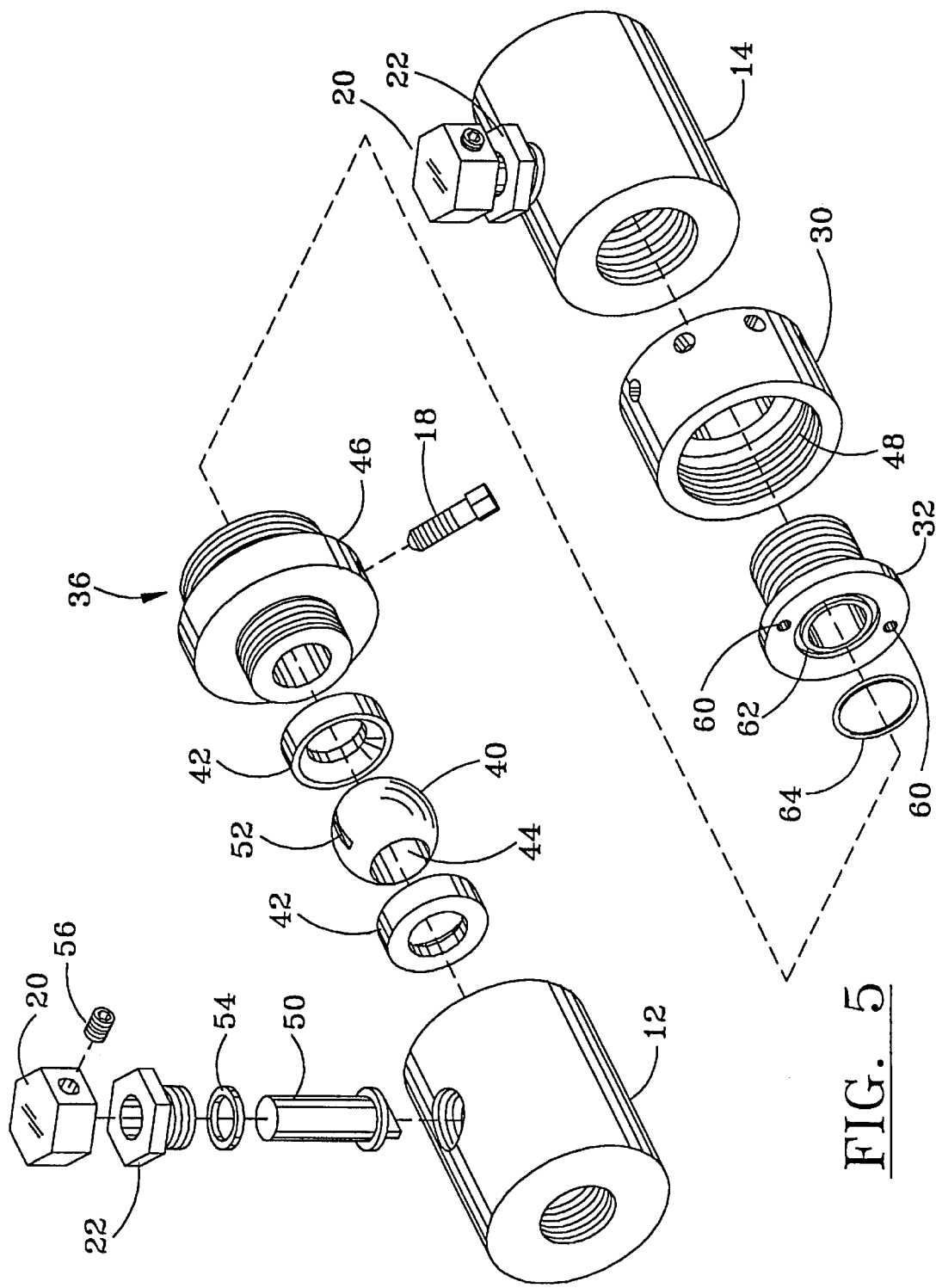
FIG. 5 is an isometric exploded view of the preferred embodiment illustrated in FIG. 1.

Turning now to FIG. 5 we see the close coupled ball valve assemblies and their bodies in expanded form. First we see the valve body 12 internally machined as illustrated in FIG. 4 to receive the valve ball 40 and its retaining bearings 42 and held in position with proper tension by the threaded adapter 36 having a central bore equal to the bore 44 of the ball 40 the adapter is threadably secured to the valve body and has a collar portion 46 which matches the outer diameter of the valve body 12. The adapter is further threaded to mate with the internal threads 48 of union collar 30 and is further taped and eternally bored perpendicularly to intersect with its internal longitudinal bore to receive the venting screw 18. With the valve ball in position within the valve body, the stem 50 is inserted through the body 12 to engage the slot 52 located in the ball 40. A sealing ring 54 and gland nut 22 secure the stem 50 to the valve body 12. A cap nut 20 is then applied to the stem 50 and secured by a set screw 56. The cap nut 20 may be remove when the valves are separated to prevent tampering and accidental loss of refrigerant. The valve insertion process is repeated in the opposite valve body 14. However, the reining member 32, is threadably mated within the valve body 14 to secure and maintain proper tension on the bearings 42 located inside the valve body 14. The union collar 30 is secured to the opposite valve body 14 by the retaining member 32. The retaining member 32 is also fitted with a pair of apertures 60 for inserting a spanner to rotate the member 32 relative to the valve body 14. The retaining member 32 having an internal bore equal to the bore 44 of the valve ball 40 serves to capture the union collar 30 in a manner whereby the collar 30 remains rotatable about the central axis of the retaining member 32 at least prior to finally assembly. A ring groove 62 and o-ring seal 64 is further provided in the face of the retaining member 32 to perfect sealing between the adapter 36 and the retaining member 32. At assembly, tightening of the union collar 30 with a spanner tends to rotate the retaining member 32, thus further completing the sealing process for union collar 30. The union Collar also having an a outer diameter equal to that of the valve body, thereby providing a uniform symmetry along the length of the two valve bodies and the close coupling therebetween.

Figure 6:
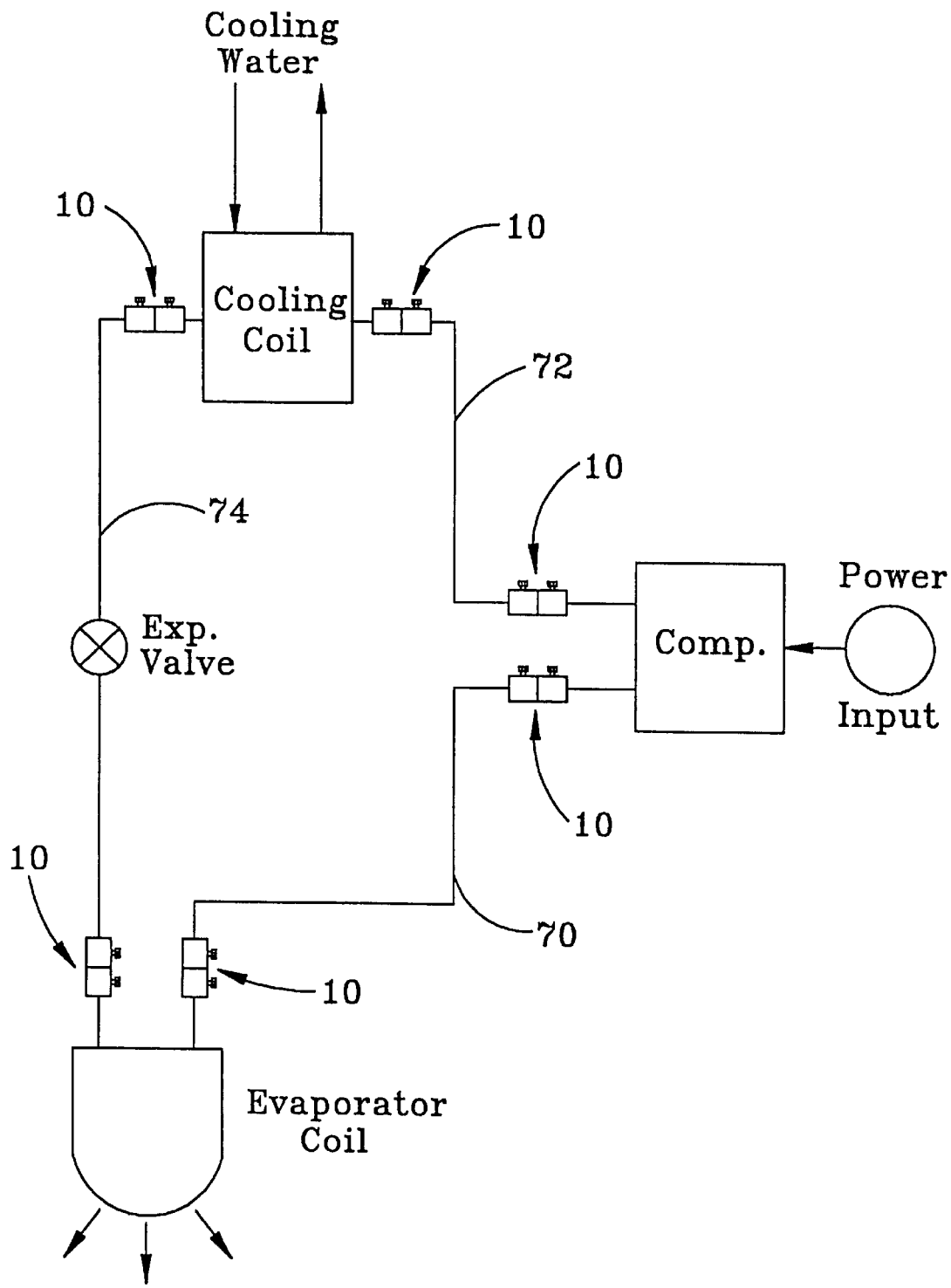
FIG. 6 is a schematic view of a typical refrigeration system illustrating location of the preferred embodiment.

The schematic illustrated in FIG. 6 shows how the isolation valve 10 would be utilized in the inlet and discharge lines 70–74 of each of the major components thereby allowing these components, or any refrigeration component within the system, to be replaced without the need to collect the existing refrigerant, purge the system, create a vacuum and then charge the system with fresh refrigerant. Utilizing the isolation valve 10, the refrigeration component having such valves previously installed can be easily removed in the following manner: simply rotate each of the two valve stem nuts 20 to a closed position, thus isolating the component from the system; release the refrigerant charge on the adapter 36 with the vent screw 18, rotate the union collar 30 until the valve bodies 12,14 are separated without disturbing the integrity of the charged system, and replacing the refrigeration component with a precharged component. Reversing the disconnecting process completes the process, with the exception of expunging a small amount of air and refrigerant from the space between the two valve assemblies 34 by first cracking open one of the valves, thus charging the annulus of the coupling assembly 16 between the valves with refrigerant, then reclosing the valve and cracking the vent screw 18 to expunge the air contaminated refrigerant trapped between the valves to atmosphere. When the vent screw 18 is again sealed, both valves 34 can then be opened to permit free flow circulation of the refrigerant in the system for operation.

Because many varying and different embodiments may be made within the scope of the inventive concept herein taught, and because many modification may be made in the embodiments herein detailed in accordance with the descriptive requirement of the law, it is to be understood that the details herein are to be interpreted as illustrative and not in any limiting sense.

What is claimed is:

1. A refrigeration system valve assembly for isolating major components of the system for removal and replacement with a precharged replacement component the valve assembly comprising:

a pair of ball valves having first and second bodies with internal bores held in a spaced apart relationship by a rotary union, the ball valves having positioning means for opening and closing the ball valves extending outside the bodies and a means for removing the positioning means when not required, the union having means for orientating the first and second valve bodies relative to each other and retaining the ball valves in position within the valve body bores, the rotary union and the valve bodies having dimensional symmetry though out their internal and external lengths, the union further including a vent means for releasing trapped air between the ball valves and plurality of external sockets spaced radially thereon.

2. A refrigeration isolation valve comprising:
   a) a first valve body defining an annular through passage;
   b) a first ball valve having an aperture therein rotatably mounted within said passage;
   c) a means, connected to said first ball valve and extending perpendicular to said aperture extending external of said first valve body, for rotating said first ball valve between an open position when said aperture is in alignment with said passage and a closed position when said aperture is transversely disposed to said passage;
   d) a second valve body defining an annular through passage;
   e) a second ball valve having an aperture therein rotatably mounted within said passage;
   f) a means, connected to said second ball valve and extending perpendicular to said aperture extending external of said second valve body, for rotating said second ball valve between an open position when said aperture is in alignment with said passage and a closed position when said aperture is transversely disposed to said passage;
   g) a means for coupling said first and second valve body wherein said coupling comprises:
      a) an adapter having an annular bore therethrough further comprising:
         i) a first externally threaded portion:
         ii) a second externally threaded portion;
         iii) a flange portion separating said first and second threaded portions: and
         iv) a threaded bore perpendicular to and intersecting with said annular bore extending through said flange portion: and
      b) a retaining member having an annular bore consistent with that of said adapter further comprising;
         i) an external threaded portion;
         ii) a flange portion having a ring groove and spanner sockets in at least one face thereof; and c) a collar having an aperture and recess for internally receiving said retainer member in a manner wherein said external threaded portion of said retainer extends through said aperture and said collar is rotatable relative said flange portion of said retainer, at least a portion of said recess being threaded to threadably receive a portion of said adapter, said collar further having external spanner sockets.

3. The refrigeration isolation valve according to claim 1 wherein said means for coupling provides structural retaining means for said first and second ball valves within said first and second valve bodies.

4. The refrigeration isolation valve according to claim 1 wherein said adapter further comprises a vent means for releasing trapped air and gas from between said first and second ball valves.

5. A method of isolating removal and replacement of major components of a charged refrigeration system comprising the steps of:

a) installing an inline gas tight ball valve assembly having two valve bodies connected by a means for separating one valve from the other without disturbing the integrity of said charged refrigeration system, said means for separating further comprising a means for venting, one said valve assembly being located in the supply fine and the discharge line adjacent each critical element of said refrigeration system;

b) charging said refrigeration system with refrigerant in the normal manner well known within the art;

c) removing a refrigeration component from said refrigeration system comprising the steps of:
  i) closing each of said valves in said supply and discharge lines leading to and from said component;
  ii) opening said means for venting to release pressure within said coupling;
  iii) uncoupling said valves without disturbing the integrity of the charged system;

d) replacing said component with a new component, precharged with refrigerant and having supply and discharge line valves compatible with said means for separating;

e) coupling said valves;

f) cracking one of said valves, thus charging said separating means, and reclosing said valve;

g) venting a small portion of said refrigerant, trapped within said means for separating to atmosphere; and h) opening both of said valves thus restoring system circulation and operation.

* * * * *